H. INGRAHAM.
Seed-Planter.
No. 18,508. Patented Oct. 27, 1857.
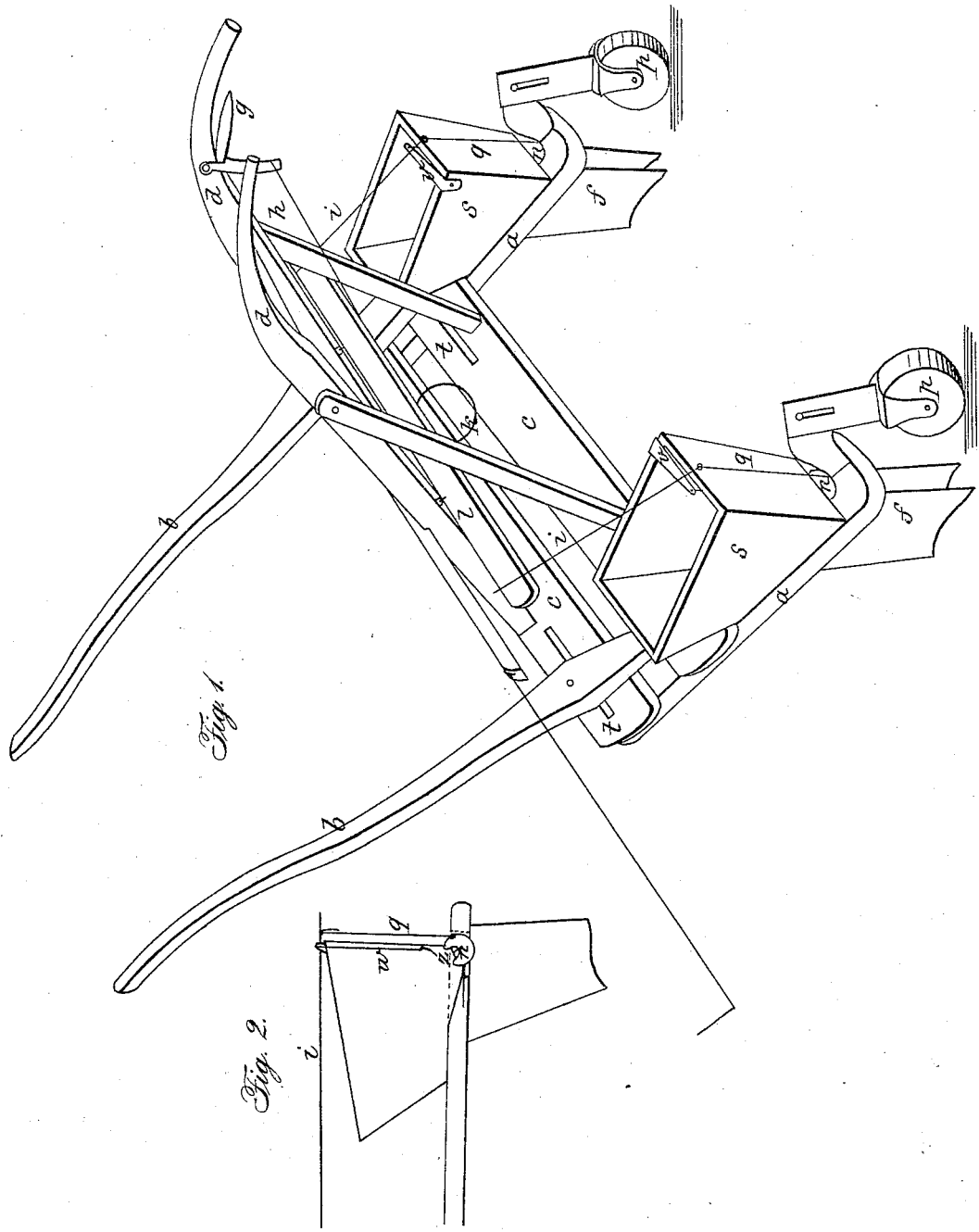

UNITED STATES PATENT OFFICE.

HANFORD INGRAHAM, OF NAPLES, NEW YORK.

IMPROVEMENT IN CORN-PLANTERS.

Specification forming part of Letters Patent No. 18,508, dated October 27, 1857.

*To all whom it may concern:*

Be it known that I, HANFORD INGRAHAM, of the town of Naples, county of Ontario, in the State of New York, have invented a new and useful Improvement on a Machine for Planting Corn and other Coarse Grains in Check-Rows; and I do hereby declare that the following is a full, clear, and exact description of the construction and operation of the same, reference being had to the accompanying drawings, in which—

Figure 1 is a perspective view, and Fig. 2 is a sectional view of the seed-hopper and its appurtenances belonging thereto.

The nature of my invention and improvement consists in constructing a planter.

The frame-work consists of two parallel base-pieces, $a\ a$, the thills $b\ b$, the cross-ties $c\ c$, which are supported and made adjustable to any desired shape or width of rows by means of four bolts passing through the base-pieces $a\ a$, through the thills $b\ b$, and through a slot, $t$, in each end of the cross-ties. The sides and ends of the seed-hoppers $s\ s$ are of wood, the bottoms of zinc or its equivalent. The valves $n\ n$ are of a circular form with an aperture, $z$, in the side to contain the seed sufficient for a hill, and are placed in a bed-piece in which is an opening to receive the valves $n\ n$. At the other end a brush is attached to regulate the distribution of the seed. This bed-piece is secured to the under side of the bottom of the hopper, bringing the valves directly under the back ends of the hoppers, and bringing the apertures within the hoppers through an opening in their bottoms, through which the seed passes. To one corner of these hoppers is attached a vibrating spring, $v\ v$, extending a little past the center and elevated a little above the hoppers. To this spring is attached an agitating-wire, $w\ w$, extending down nearly to the aperture in the valve. Through the back end of the base-pieces $a\ a$, is a mortise of size and shape sufficient to receive the bed-pieces. Directly under this mortise the hollow tooth $f\ f$ is secured by means of bolts passing through the flange of the tooth and through the cast-iron plate upon the top, which supports the wheels $p\ p$. The handles $d\ d$ are secured to the cross-ties $c\ c$, to one of which is affixed the finger-lever $g$, from which the rod $h$ extends to slat $l$. To each end of this slat, which is hinged to the handles, arms $i\ i$ are attached by means of a hook passing through the slat and fastened on the under side with a nut, by which means they may be adjusted to any other arrangement of the machine. To the opposite ends of these arms, which extend over the hoppers, are attached wires $q\ q$, extending down and attached to the valves $n\ n$.

The operator takes the machine by the handles $d\ d$, and at marked intervals presses his fingers upon the finger-lever $g$, which moves the rod $h$ and turns the slat $l$, which raises the arms $i\ i$ and the wires $q\ q$, which turn the valves $n\ n$, and deposit the seed contained in the apertures through the hollow tooth $f\ f$, which is covered by the wheels $p\ p$. By relieving from pressure the lever $g$, the arms $i\ i$ are forced down upon the vibrating springs $v\ v$ by the coiled wire $p$. They give to the agitating-wires $w\ w$ and to the valves a vibrating motion, causing the apertures $z\ z$ to fill with accuracy and certainty.

I do not claim any of the described parts separately or irrespective of their arrangement; but

What I claim, and desire to secure by Letters Patent, is—

The arrangement of the seed-hoppers $s\ s$, in connection with the hollow teeth $f\ f$, the valves $n\ n$, the agitating-wires $w\ w$, and the vibrating springs $v\ v$, for the purpose and in the manner substantially as set forth in the specification.

HANFORD INGRAHAM.

Witnesses:
JOSIAH PORTER,
A. F. SEACORD.